高 
2,896,349
ADVERTISING SPINNER

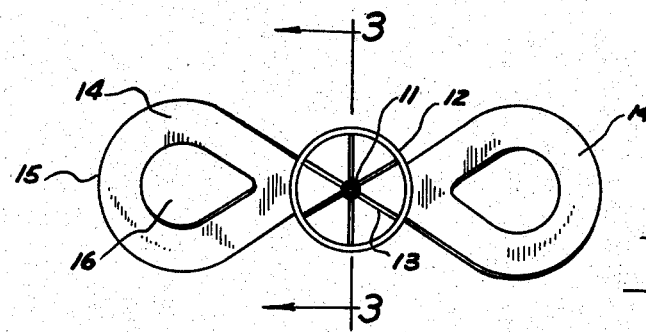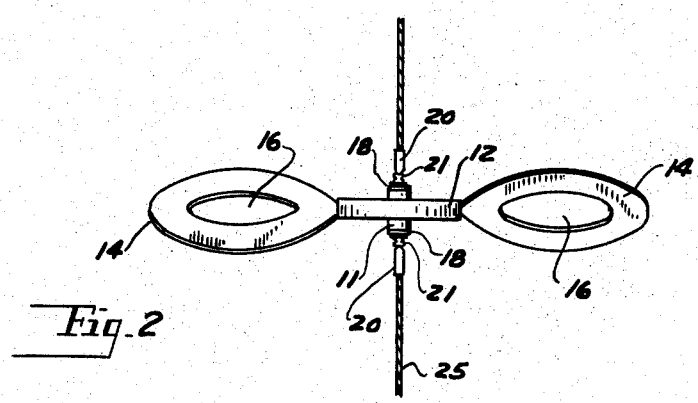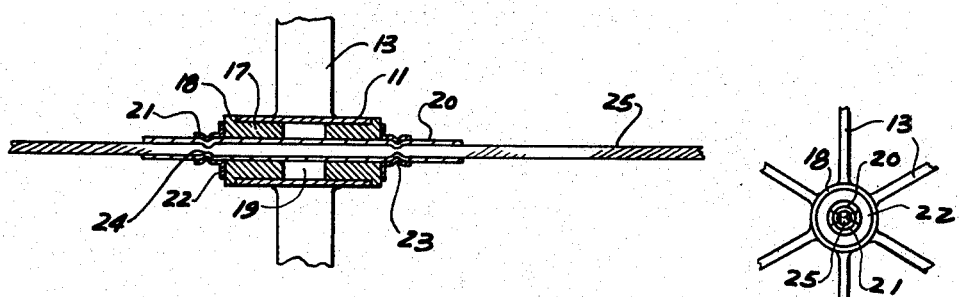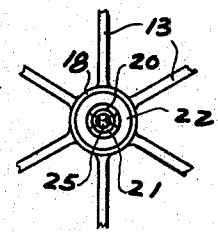

Lawrence R. Morrison, Detroit, and Erik E. Erikson, St. Clair Shores, Mich.

Application September 16, 1957, Serial No. 684,087

1 Claim. (Cl. 40—39)

This invention relates to an advertising spinner and more particularly to a novel article of manufacture, a plurality of which are adapted to be spaced along a cable and rotatably journaled thereon.

It is an object of this invention to provide in an advertising spinner a novel mounting for suspending and securing said spinner against longitudinal movement upon a cable and for free wind rotation thereof.

It is the further object to provide a novel bearing assembly for the spinner which consists of nylon bushings secured to the spinner hub loosely journaled upon a metallic bearing fixedly secured to the cable together with end thrust means on the bearing loosely and retainingly engaging said bushings against longitudinal displacement.

It is the further object of this invention to provide a cable of one material, a tubular bearing of a different material and retaining eyelets of a third material, all of which are different from the material of the bushings employed.

These and other objects will be seen from the following specification and claim in conjunction with the appended drawing in which:

Fig. 1 is a side elevational view of the advertising spinner.

Fig. 2 is a plan view thereof, as mounted upon a flexible cable.

Fig. 3 is a section taken on line 3—3 of Fig. 1, on an enlarged scale.

Fig. 4 is a fragmentary end elevational view thereof.

It will be understood that the above drawing illustrates merely a preferred embodiment of the invention, for illustration, and that other embodiments are contemplated within the scope of the claim hereafter set forth.

Referring to the drawing, the present advertising spinner is constructed of suitable plastic material such as polyethylene and is adapted for mounting upon a horizontally disposed soft flexible steel cable 25.

A series of these spinners of various attractive colors are mounted in spaced relation upon said cable and by means of the mounting provided retained against longitudinal displacement.

The present spinner is molded of the above plastic material or equivalent and includes the central apertured hub 11 and the integral relatively narrower ring 12 with a series of radially spaced spokes 13 interposed providing a rigid unit.

The present invention contemplates a plurality of spaced angularly related blades which project radially of the hub as an extension of said ring.

In the present preferred embodiment, there are provided a pair of oppositely arranged angularly related blades 14 which extend from ring 12 and which include the rounded outer ends 15. The blades have formed therethrough the central elongated apertures 16 whose shape corresponds to the peripheral shape of the blades. Such apertures reduce the total mass of the spinner and accordingly by reducing the total areas permit a slower rotation under the action of the wind, than would be accomplished with the blades solid.

A suitable self lubricating nylon bushing is employed which is snugly positioned within hub 11. In the present embodiment, a pair of longitudinally spaced nylon bushings 17 are snugly projected into the opposite ends of the molded hub 11. Said bushings include the annular outer flange 18 which cooperatively engages said hub and preferably is of a corresponding diameter. The inner ends of said bushings are spaced apart an appreciable distance defining therebetween the annular air space 19 which facilitates cooling of the bushings under constant use.

The elongated tubular metallic bearing 20 preferably constructed of aluminum is loosely positioned through bushings 17 and projects beyond their outer ends. Bearing 20 is adapted for slidable positioning over cable 25 and is secured thereon by crimping.

A pair of tubular eyelets 21 having annular flanges 22 are slidably positioned over bearing 20 so that their flanged ends loosely engage bushings 17. These eyelets are adapted to permit free rotation of the spinner hub and at the same time prevent end-wise displacement thereof.

Upon assembly of the hub with the bushings therein centrally over bearing 20, said bearing is manually slid over cable 25 to the correct location after which the eyelets 21 are crimped inwardly as at 23.

This crimping immovably retains the eyelets with respect to the sleeve 20. This same crimping effects a corresponding inward crimping of the radially adjacent portions of bearing 20 into the body of cable 25 for effectively securing said bearing against longitudinal movement thereon. The eyelets 21 are preferably constructed of brass.

Having described our invention, reference should now be had to the following claim.

We claim:

An advertising spinner adapted to rotate on a cable comprising centrally apertured hub and a plurality of spaced angularly related blades projecting radially therefrom, a pair of longitudinally spaced nylon bushings snugly projected into opposite ends of said hub, a tubular metallic bearing loosely positioned through said bushings and projected beyond their outer ends, adapted for slidable positioning upon said cable, and a pair of flanged eyelets positioned over opposite ends of said bearing with their flanges loosely engaging outer ends of said bushings, said eyelets and radially adjacent portions of said bearing being crimped inwardly securing said eyelets to said bearing and said bearing to said cable.

References Cited in the file of this patent

UNITED STATES PATENTS

| 954,288 | Holloway | Apr. 5, 1910 |
| 1,639,129 | Cleveland | Aug. 16, 1927 |
| 1,708,631 | Peyton | Apr. 9, 1929 |
| 2,797,510 | McLarty | July 2, 1957 |